May 9, 1944.  F. G. SILVA ET AL  2,348,657
AUTOMATIC SCREW MACHINE
Filed Oct. 11, 1941  10 Sheets-Sheet 1

INVENTORS
Frederick G. Silva
Wray S. Seymour
BY
Cumpston & Shepard
their ATTORNEYS

May 9, 1944.  F. G. SILVA ET AL  2,348,657
AUTOMATIC SCREW MACHINE
Filed Oct. 11, 1941  10 Sheets-Sheet 5

INVENTORS
Frederick G. Silva
Wray B. Seymour
BY
Their ATTORNEYS

May 9, 1944.  F. G. SILVA ET AL  2,348,657
AUTOMATIC SCREW MACHINE
Filed Oct. 11, 1941   10 Sheets-Sheet 7

INVENTORS
Frederick G. Silva
Wray S. Seymour
BY
Cumpston & Shepard
Their ATTORNEYS May 9, 1944.  F. G. SILVA ET AL  2,348,657
AUTOMATIC SCREW MACHINE
Filed Oct. 11, 1941   10 Sheets-Sheet 8

INVENTORS
Frederick G. Silva
Wray S. Seymour
BY
their ATTORNEYS

May 9, 1944.  F. G. SILVA ET AL  2,348,657
AUTOMATIC SCREW MACHINE
Filed Oct. 11, 1941  10 Sheets-Sheet 9

INVENTORS
Frederick G. Silva
Wray S. Seymour
BY
their ATTORNEYS

Patented May 9, 1944

2,348,657

UNITED STATES PATENT OFFICE 2,348,657

AUTOMATIC SCREW MACHINE

Frederick G. Silva and Wray S. Seymour, Rochester, N. Y., assignors to Davenport Machine Tool Co., Inc., Rochester, N. Y., a corporation of New York Application October 11, 1941, Serial No. 414,626

14 Claims. (Cl. 29—44)

This invention relates to automatic screw machines and, more particularly, to mechanism for operating and controlling the several component parts thereof, such as the horizontal turret and cross slides and the work spindle, in coordination with one another, one object of the invention being to provide a more simple, rapid, rugged, and convenient machine of the character described.

Another object is the provision of a more simple, rigidly constructed and reliable mechanism for actuating the horizontal turret and its slide.

Another object is to provide such a machine with a more simple and strong mechanism for operating the cross slides.

Another object is to provide a more simple and rapid reversing mechanism for the work spindle.

A further object is to afford a more compact, yet accessible construction and arrangement of the mechanism for the purpose of simplifying and facilitating the setting up and operation of the machine.

To these and other ends the invention resides in certain improvements and combinations of parts, all as will be hereinafter more fully described, the novel features being pointed out in the claims at the end of the specification.

The present invention is an improvement upon the automatic screw machine covered by the copending patent application of Frederick G. Silva and William S. Davenport, Serial No. 366,130, and resides in improvements in the construction, arrangement, and operation of some of the features disclosed in said copending application to which reference is made for a more complete description of the construction and arrangement of features employed in the present machine, but forming no part of the present invention. Certain of the parts disclosed but not claimed herein are claimed in applicants' divisional applications, Serial Nos. 510,260 and 518,110.

The invention is preferably embodied, in the present instance, in an automatic screw machine comprising the usual or any suitable rotary work spindle, and horizontal turret and cross slides carrying the tools which are advanced in predetermined sequence for operation on the work piece rotated and fed by the spindle. Mechanism is provided for indexing, advancing and retracting the horizontal turret, advancing and retracting the cross slides and for reversing and changing the speed of the work spindle, as well understood in the art, and the present invention resides in improved mechanism for accomplishing such operations in precisely coordinate sequences.

The work spindle, indicated generally at 20 (Fig. 1), is rotatably mounted in bearings on the main frame 21 of the machine and comprises the usual or any suitable spindle assembly, as well understood in the art, to which further reference will be made hereinafter. The spindle rotates and feeds the work piece 22 for the sequential cutting operations of the tools, as usual in such machines.

Figure 6:
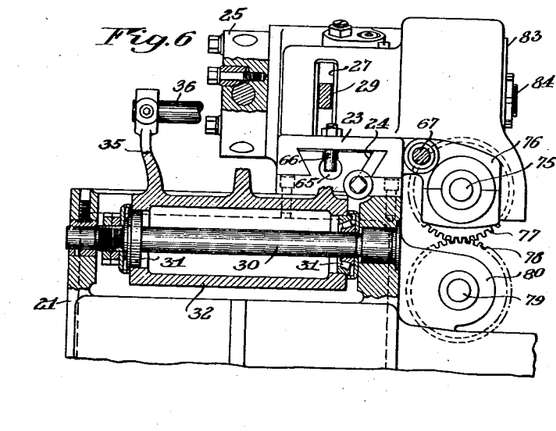
Fig. 6 is an elevation of parts shown in Fig. 5 as viewed from the right, partly in section and broken away.

The horizontal turret mechanism preferably comprises a slide 23 supported on guideways 24 (Fig. 6) on the main frame, for movement as usual, toward and from the work spindle, longitudinally of the axis of the spindle. The slide carries a horizontal turret 25, of the known or any suitable variety, having a peripheral series of sockets in which the different tools are mounted for successive presentation to the work by the rotary indexing of the turret in roller bearings 26 on the slide.

Figure 9:
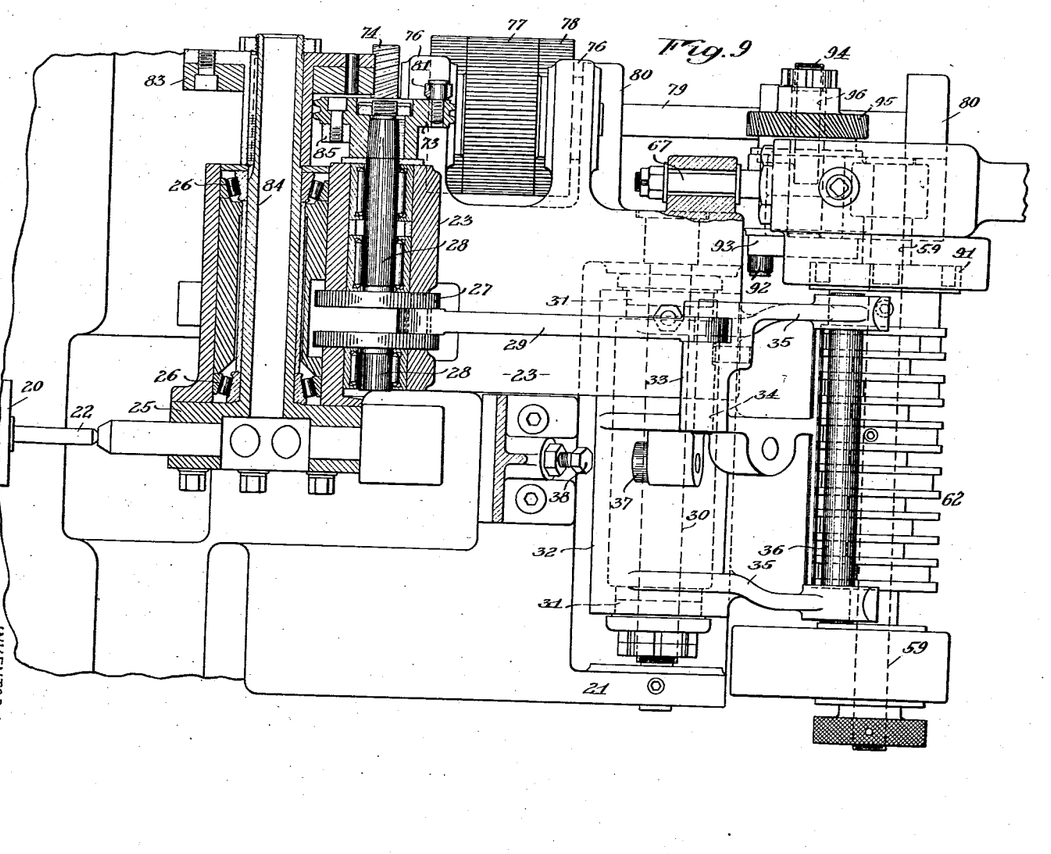
Fig. 9 is a plan of the horizontal turret and parts of its actuating mechanism, partly in section, as viewed from above.

The mechanism for moving the turret slide toward and from the work comprises, preferably, a crank and rod device for producing a rapid and uniform movement of the turret for indexing, the rod being further actuated by cam means, while the slide is advanced, for effecting the feeding movement of the turret for operating the tools. The crank is shown at 27 (Fig. 9) on a shaft 28 mounted in roller bearings on the slide, as shown, and rotated by means hereafter described, and the rod is shown at 29 having a rotary connection at one end with the crank. The other end of rod 29 is connected with and actuated by an improved cam shaft mechanism which will now be described.

Figure 5:
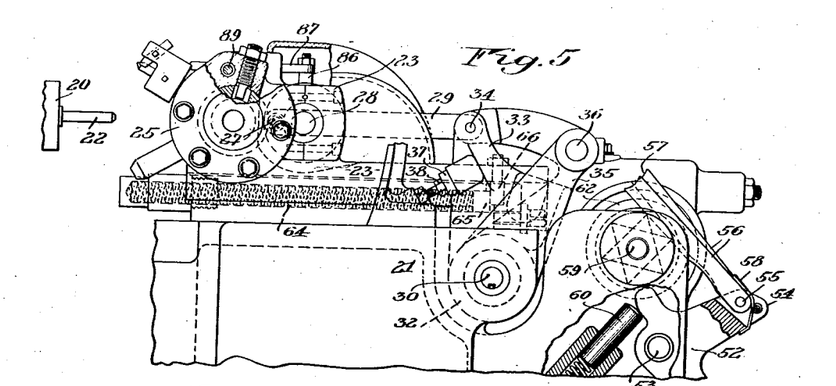
Fig. 5 is an elevation of the horizontal turret parts shown in Fig. 3, but in a different position and partly in section.

Fixed in the main frame is a shaft 30 (Fig. 6) of substantial and rigid proportions, carrying roller bearings 31 on which are supported the opposite ends of an elongated cylindrical hub 32, the substantial diameter and thickness of which, with its substantially spaced end bearings, afford a highly rigid mounting and construction by means of which the hub may be rocked or oscillated on its bearings substantially without friction or likelihood of distortion. Extending integrally from hub 32 is an arm 33 with which is pivotally connected, as at 34, the other end of the turret crank rod 29. Extending integrally from hub 32 are additional spaced arms 35 carrying a substantial and rigid cylindrical bar 36 for engagement, selectively, by a series of cam driven actuators hereinafter described. Hub 32 carries also an abutment 37 (Fig. 9) for engagement with an adjustable set-screw, or stop, 38, for limiting the rocking movement of the hub in one direction. It will be seen that as the slide crank 27 is intermittently rotated through 180° from the horizontal position shown in Fig. 9 to that shown in Fig. 5, its connecting rod 29 rocks hub 32 until stopped by the abutment 37, at the same time rapidly retracting the turret slide, such mechanism affording a positive withdrawal of the turret and its tool to a position in which the turret may be indexed by mechanism hereinafter described.

Figures 3, 13:
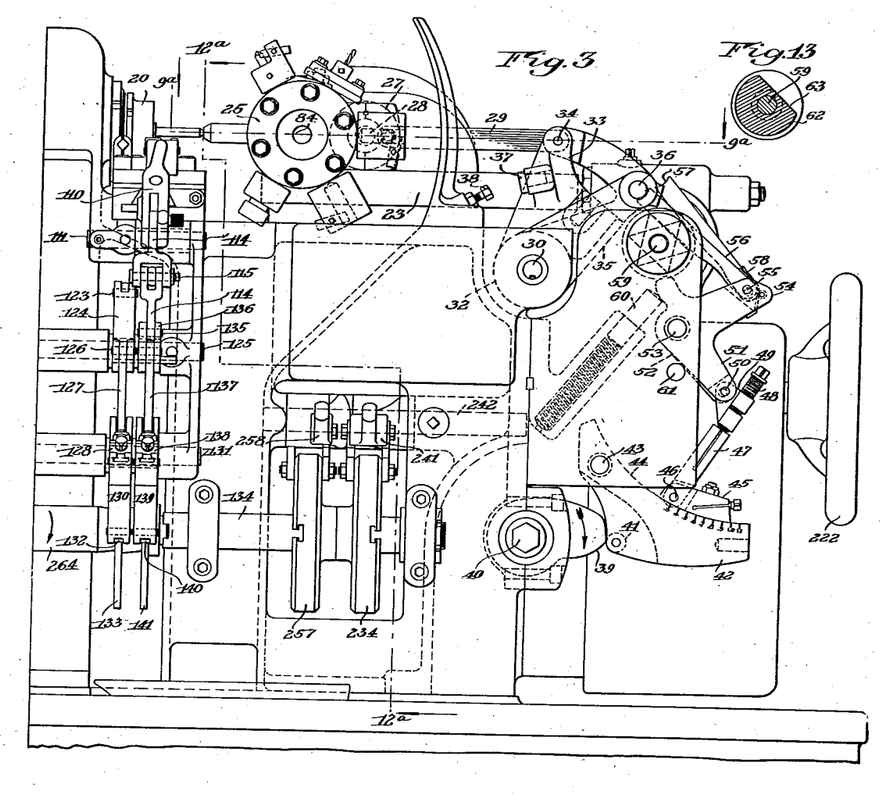
Fig. 3 is an elevation of the front side of the horizontal turret end.
Fig. 13 is a detailed sectional view of the cam spindle for selecting the actuators for the horizontal turret.
Figure 8:
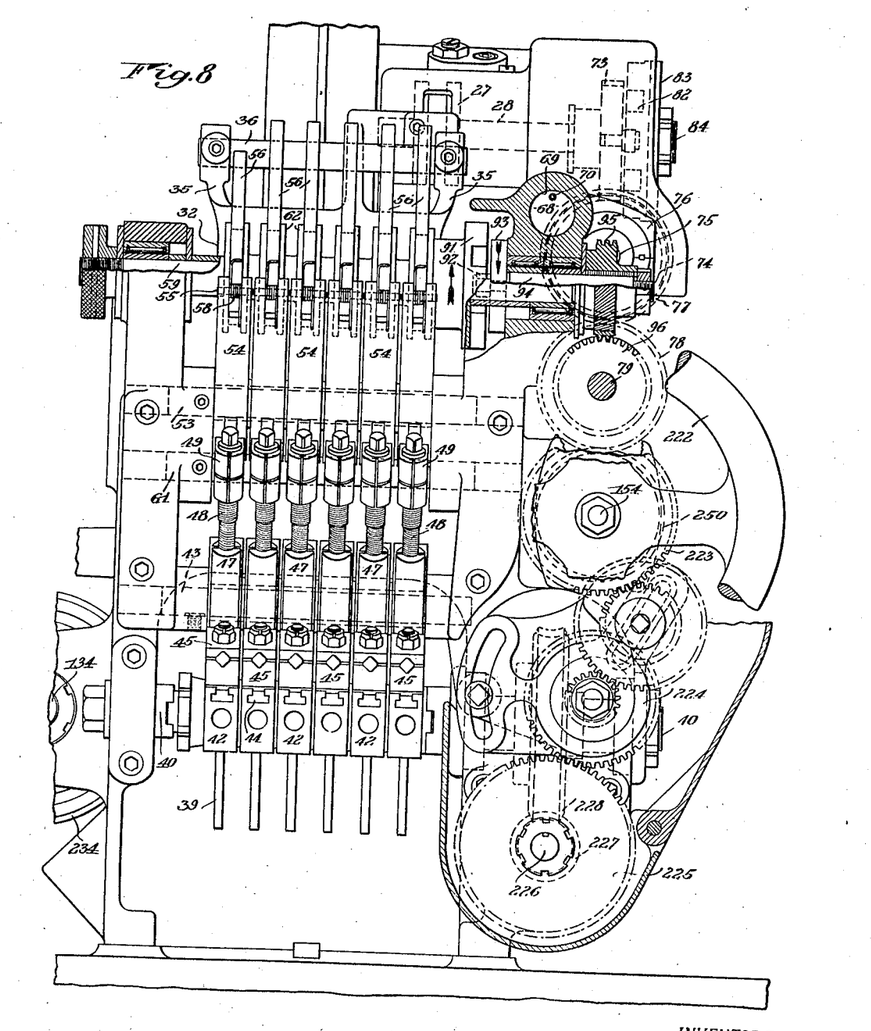
Fig. 8 is an enlarged elevation of the mechanism for actuating the horizontal turret as viewed from the right in Fig. 3, partly in section and broken away.

The present machine preferably comprises the same novel series of cams and cam shaft assembly for the horizontal turret as disclosed in said copending application, and as indicated generally at 39 on a shaft 40 extending transversely at the turret end of the machine (Fig. 3). Each of said cams 39 engages a roller 41 on a lever 42 pivoted at 43 on the main frame, for rocking the lever in accordance with the shape and proportions of the cam. Lever 42 has an arcuate, T-slotted upper surface 44 on which is mounted and slides an adjustable block 45, as shown in Figs. 3 and 8, and as described in said copending application. Pivotally connected with each block, as at 46, is a link 47 carrying a rotatable and threaded outer end section 48. Threadedly connected with the link end 48 is a collar 49 pivotally connected as at 50 with one arm 51 of the bellcrank lever 52 pivotally mounted as at 53 on the main frame. Arm 54 of the lever is bifurcated to provide a pivotal mounting 55 for an actuator arm 56 having a recessed upper end 57 adapted for engagement with bar 36 of the rocker hub 32. A spring 58 normally presses each actuator 56 downwardly against a cam spindle 59 mounted at its ends for indexing rotation in bearings on the main frame. A spring actuated plunger 60 bearing on an abutment of lever 52 controls the mechanism to maintain roller 41 on its cam, or until lever 52 strikes a stop 61 on the frame.

The actuator arms 56, each having a longitudinal thrusting movement controlled by its cam 39, are selectively positioned for actuating engagement with the rocker bar 36 by a corresponding series of cam surfaces on said spindle 59 as the spindle is indexed by means hereafter described. These surfaces are shown in Fig. 13 as each comprising a cylindrical portion 62 and a flattened portion 63. The flattened portions 63 are suitably located circumferentially of spindle 59 so as to move under the coacting actuator 56 at the time desired for bringing it into actuating control of the movement of the turret. That is, the actuators are normally maintained in a raised, inactive position by engagement with the cylindrical portions 62 of the cams, but are selectively and individually lowered by the flat portions 63 to position for engagement with the rocker bar 36 as the actuator is driven longitudinally by its cam 39. It will be seen that this mechanism furnishes a simple, sturdy and rugged construction, in conveniently accessible arrangement, for producing the desired feeding actuation of each tool as brought to position for action on the work piece. The rigid form of construction employed, including strongly constructed hub 32 and its substantially spaced, rigid bearings, assures smooth and precise operation of the turret without any tendency of the parts to cock, bind, or yield under the operating stresses.

The turret slide is preferably provided with means for normally urging it and hub 32 toward a retracted position, comprising, preferably, a compression spring 64 (Fig. 5) housed in a bore in the frame and bearing at one end 65 against a stop 66 on the slide. Such retracting force on the slide is preferably cushioned by means comprising a rod 67 (Fig. 1) fixed on the slide and carrying a piston 68 reciprocating in a cylinder 69 on the main frame. The piston is formed with suitable ports 70 for slowly transmitting the fluid with which the cylinder is filled, to provide a dashpot effect, for cushioning the retracting actuation of the slide by spring 64, as well understood in the art. A plunger 71 bearing against a spring 72 in a housing on the frame, affords a final buffer. These provisions insure a smooth motion of the slide.

Figure 7:
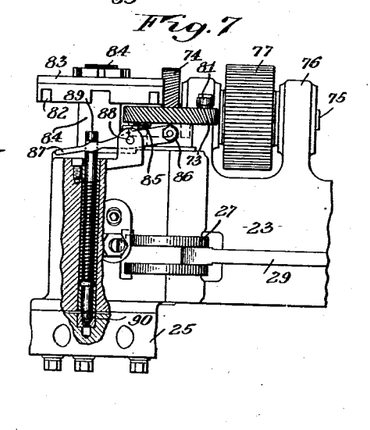
Fig. 7 is a top plan view of parts shown in Fig. 5 and illustrating the horizontal turret locking mechanism.

The means for intermittently rotating the crank 27 for reciprocating the turret slide comprises, preferably, an angular gear 73 (Figs. 1, 7, and 9), meshing with a mating gear 74 fixed on a shaft 75 rotating in suitable bearings 76 on the slide. Fixed on shaft 75 is a gear 77 meshing with a gear 78 fixed on a shaft 79 rotating in bearings 80 on the frame and driven by means hereafter described. Gear 78 is elongated to afford continuous engagement with gear 77 as the latter slides with the turret slide.

The means for indexing the turret is generally similar to that disclosed in said copending application comprising, preferably, a spur 81 (Figs. 7 and 9) on gear 73 arranged to rotate into engagement with one of a series of radial slots 82 formed in the side face of an index wheel 83 fixed on an extension of shaft 84 of the tool turret. The spur 81, during rotation, enters one of the slots 82, rotates the wheel 83 to index the turret and then passes out of the slot, at the same time positioning the succeeding slot 82 in position to be engaged during the next rotation of the spur, and so on.

The means for precisely centering and locking the turret in each index position comprises, preferably, a cam abutment 85 (Figs. 7 and 9) fixed on the opposite face of gear 73 in position to actuate a roller 86 on one end of a lever 87 pivoted at 88 on a bracket on the slide. The opposite end of the lever engages in an opening in a spring actuated plunger 89. The opposite tapered end of the plunger is positioned to register with and enter any one of a series of tapered openings 90 formed in a side face of the turret. By this means, as gear 73 rotates, plunger 89 is lifted out of one opening 90, against the action of its spring, just prior to indexing action. Plunger 89 being quickly released, however, and pressed by its spring against the face of the turret, seats in the next opening 90 of the series and so centers and locks the turret in its next position, and so on for each index position.

The cam spindle 59 for selecting the actuators 56 is likewise indexed by a similar mechanism driven from the same shaft 79 which actuates the turret index and slide crank 27, so that these parts are all closely interconnected for precise coordination. Spindle 59 (Figs. 1 and 8) has fixed thereon a radially slotted index wheel 91, similar to the turret index wheel 83, coacting with a spur 92 on a side face of a disk 93 fixed on one end of a shaft 94 rotating in bearings on the frame and having fixed on its other end an angular gear 95 mating with a gear 96 fixed on said shaft 79. Means are provided for centering and holding spindle 59 and its index wheel in each position, comprising (Fig. 1) a roller 91a on a lever 91b pivoted on the frame at 91c and provided with suitable spring means 91d for seating roller 91a in the outer end of each radial slot of the index wheel 91, to yieldably center and hold it in each indexed position. As shaft 79 is intermittently rotated by means described below, the turret slide crank 27 is rotated, the turret is indexed and locked in position, and the cam spindle 59 is indexed to select the corresponding actuator and cam for advancing the turret for an operation on the work piece, all in predetermined timed sequence. After the operation, the turret slide crank 27 is again rotated to quickly withdraw the slide and the turret is again indexed and locked, a different actuator and cam are selected and the cycle repeated with a different tool, and so on for each tool of the turret, these operations being quickly performed in succession by the mechanism described comprising the rapidly operating system of independent cams and actuators as disclosed in said copending application.

The cross slide mechanism (Figs. 1 and 12) comprises a pair of slides 97 and 98 carrying the usual tools 99 and 100 and sliding in ways 101, 102 on opposite sides of the machine frame. A spring 103, housed in a bore in each slide, presses at one end 104 against a stop 105 on the frame, to retract the slide. Pivoted in a lug 106 on the top of each slide is a link 107 preferably comprising a turnbuckle 108 for adjusting its length to control the position of the slide. The outer end of the link is pivotally connected at 109 with one arm of a lever 110 extending over the outer end of the slide, as shown. Lever 110 is pivoted on the frame at 111 and carries a stop pin 112 arranged to engage an abutment 113 on the frame to limit the outward movement of the slide, the above parts being the same for each of the cross slides.

Means are provided for rapidly advancing and retracting the slides, in conjunction with cam means for producing the feeding action for cutting the work. Such means comprises, preferably, a pair of toggle levers 114 for each slide (Fig. 12), one lever of each pair being pivoted at one end to the slide lever 110. The links of each pair have a pivotal knee connection with each other at 115 at which point a means, hereafter described, is also connected for rapidly straightening and braking the toggle to effect quick movement of the slide.

The cam means for effecting the feeding movement of the two cross slides are generally similar. Slide 97 has the opposite end of its pair of toggle links pivoted as at 116 (Fig. 12) to one arm of a bellcrank lever 117 provided with a stop pin 118 positioned for contact with a frame abutment 119 to limit the retracting movement of the lever. The opposite arm of the lever is pivotally connected, as at 120, with a link 121 having any known or suitable means, as indicated generally at 122, for adjusting its length. The opposite end of link 121 is pivoted, as at 123, to one arm of the bellcrank lever 124 pivoted on the frame as at 125 and having its other arm pivoted at 126 to a link 127 which is pivotally connected with a block 128 sliding in a T-slot connection with the arcuate means 129 of a lever 130 pivoted on the frame at 131 and carrying a roller 132 coacting with a cam 133 (Fig. 3) fixed on a cross slide cam shaft 134, to which further reference will be made hereafter.

The other cross slide 98 has its toggle levers pivotally connected at 135 (Fig. 12) with a lever 136 pivoted on the frame at 125. Pivoted to the lever 136 is a link 137 pivotally connected with a block 138 adjustably carried on a lever 139 having a roller 140 bearing on a cam 141 on shaft 134, as in the case of the opposite slide. By selecting suitable cams, adjusting the blocks 128 and 138 on the cam levers and adjusting the length of the link 107, the feeding action of the cross slides may be precisely controlled in position and amplitude, as disclosed in said copending application.

The means for straightening and breaking the toggles of the cross slides comprise a pair of arms 142 and 143 (Fig. 12), respectively, provided with any known or suitable means, as indicated generally at 144 and 145, respectively, for adjusting their length. One end of each arm is pivotally engaged with the knee connection 115 of the corresponding toggle. The opposite ends of the arms are pivotally connected with cranks 148 and 149 (Fig. 1) on gears 150 and 151, respectively, which mesh with gears 152 and 153, respectively, the latter being intermittently clutched to the main, or hand wheel shaft, 154, rotating in suitable bearings on the main frame. Shaft 154 is geared to and drives the cross slide cam shaft 134. Gears 152 and 153 are clutched to the shaft by means hereafter described so as to operate in proper timed sequence with the operations of the horizontal turret and its tools.

By the means described, comprising the cranks 148 and 149, the toggles are straightened to rapidly advance the cross slides and, as the toggles are straightened, the cams 133 and 141, through their described connections, comprising the toggles, give to the slides the further feeding motion required for the desired cutting operations on the work, in a rapid and precisely controlled manner. As will be noted, the cross slide mechanism is relatively simple and strong in construction, and is compactly, but accessibly arranged at the sides of the machine. The toggle cranks 148 and 149 are rigidly supported intermediate the toggles and, when simultaneously operated, tend to counterbalance the stresses produced, in the operation of the toggles.

Figures 11, 14, 15:
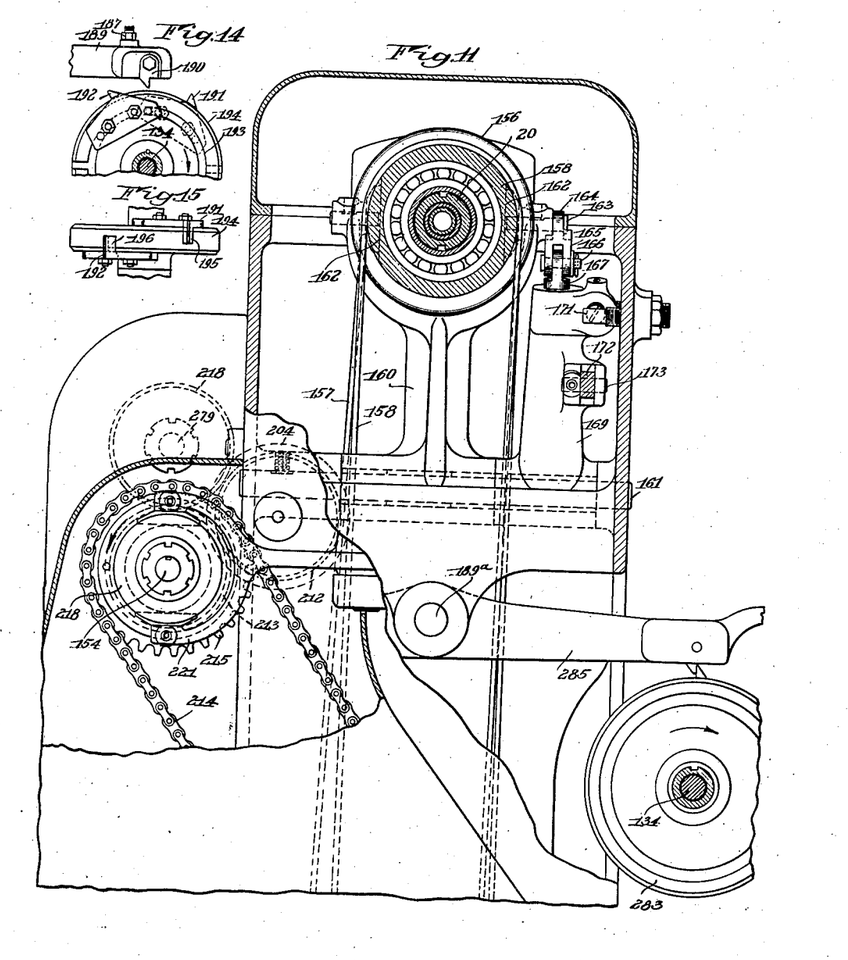
Fig. 11 is a sectional elevation substantially on the line 11a—11a in Fig. 2.
Figs. 14 and 15 are a side elevation and top plan, respectively, of the carrier and trip dogs and lever for actuating the reversing mechanism of the work spindle.

Improved means are provided for rapid operation in timed relation with the operations of the horizontal turret and cross slides, for reversing the direction and rate of rotation of the work spindle, as desired in connection with certain work, such as threading operations. As usual in such machines, the work spindle is provided with pulleys 155 and 156 (Fig. 2) driven by belts 157 and 158, respectively, from any suitable motor means in opposite directions and at the speed desired for each direction. The motor means is preferably located in the main frame as indicated by the belts in Fig. 11. These pulleys are mounted to normally rotate idly concentrically with the spindle, but are intermittently and alternately fixed to the spindle, as desired, by any known or suitable intermediate clutch means indicated generally at 159, as well understood in the art. The clutch is shifted by means of a shipper lever 160 having its lower end pivotally mounted on a spindle 161 on the frame and having its other end bifurcated to form forked arms which are provided with shoes engaging in slots 162 in opposite sides of clutch 159, as shown, for sliding the clutch on the work spindle to alternately engage and release the pulleys 155 and 156, as well understood in the art.

Shipper lever 160 is rocked by means comprising a trunnion 163 (Figs. 4 and 11) on the lever to which is pivotally connected the upper end 164 of a short link 165 having its other end pivoted, as at 166, to the upper end of a plunger 167 sliding in a bore 168 formed longitudinally in the upper end of an arm 169 which is pivotally mounted at its other end on spindle 161. A compression spring 170 (Fig. 4) confined between the end of plunger 167 and the inner end of bore 168, urges the plunger outwardly so as to tend to swing link 165 and arm 169 with its plunger 167 to one side or the other, out of line with each other, as shown. A pair of studs 171 extending inwardly from suitable mountings on the frame, in spaced relation on opposite sides of arm 169, serve as stops to limit such swinging or rocking motion of the arm and link and it will be seen that as the link and arm pass an alined, or dead center relation, the spring 170 throws them rapidly against the opposing stop and thereby swings the shipper lever 160 to shift the clutch to disengage one and engage the other of pulleys 155 and 156, with the work spindle, to reverse and change its speed.

The means for shifting arm 169 preferably comprises a link 172 (Figs. 4 and 10) pivotally connected at one end as at 173 with the arm and at its other end with an arm 174 mounted at its other end to rock on a spindle 175 on the frame. The pivotal connection between link 172 and arm 174 comprises, preferably, a stud 176 projecting outwardly from arm 174 and carrying a roller 177. Roller 177 plays between the oppositely inclined, upper cam ends 178 and 179 of a pair of thrust elements or plungers 180 and 181, respectively, mounted independently to slide vertically in bores 182 and 183 in a bracket 184 on the frame. Each plunger has an enlarged lower end forming a shoulder 185 against which the spring bears at one end to retract the plunger to lowered position in which stop pins 186 rest against the upper end of bracket 184. The lower ends of the plungers are equipped with adjustable studs 187 resting against ends of a pair of levers 188, 189 (Figs. 4, 10, and 14), pivoted on shaft 189a on the frame and each carrying at its front end, a finger 190 positioned for engagement with dogs 191 and 192 mounted in a T-slot 193 for adjustment circumferentially of a carrier 194 fixed on the cross slide cam and carrier shaft 134. As the shaft and carrier rotate the dogs strike the fingers of the levers to raise them and also the plungers 180 and 181, against the resistance of their springs, for engagement with the roller 177 to shift the arm 174 and link 172 and shift the clutch. The levers 188 and 189 are provided at their rear ends with adjustable studs, as 189b (Fig. 10), for engagement with an abutment on the frame, as shown, to serve as positioning stops for the levers.

Means are provided, furthermore, to insure that the dogs are set for actuating the plungers successively, since simultaneous actuation might result in undue stresses and breakage of the parts. This means comprises, preferably, a finger on each dog, 195 and 196 (Figs. 14 and 15), extending in overlapping relation with each other on the periphery of the carrier 194, so that these fingers will engage each other and compel a staggered arrangement of the dogs, thus guarding against inadvertent simultaneous actuation of the plungers.

Dogs 191 and 192 are adjusted to the desired positions on carrier 194 and as the latter rotates, the inclined cam surfaces of the dogs and of the fingers 190 on the levers act to swing the levers upwardly, one at a time, to cause the inclined upper end of one of the plungers to thrust roller 177 in the opposite direction toward the end of the other plunger, thereby throwing the pivoted link and arm arrangement toward and past dead center from which point it is snapped against the opposite stop pin 171 to shift the clutch, with great rapidity, at the precise instant desired in timed relation with the operation of the tools.

Figure 1:
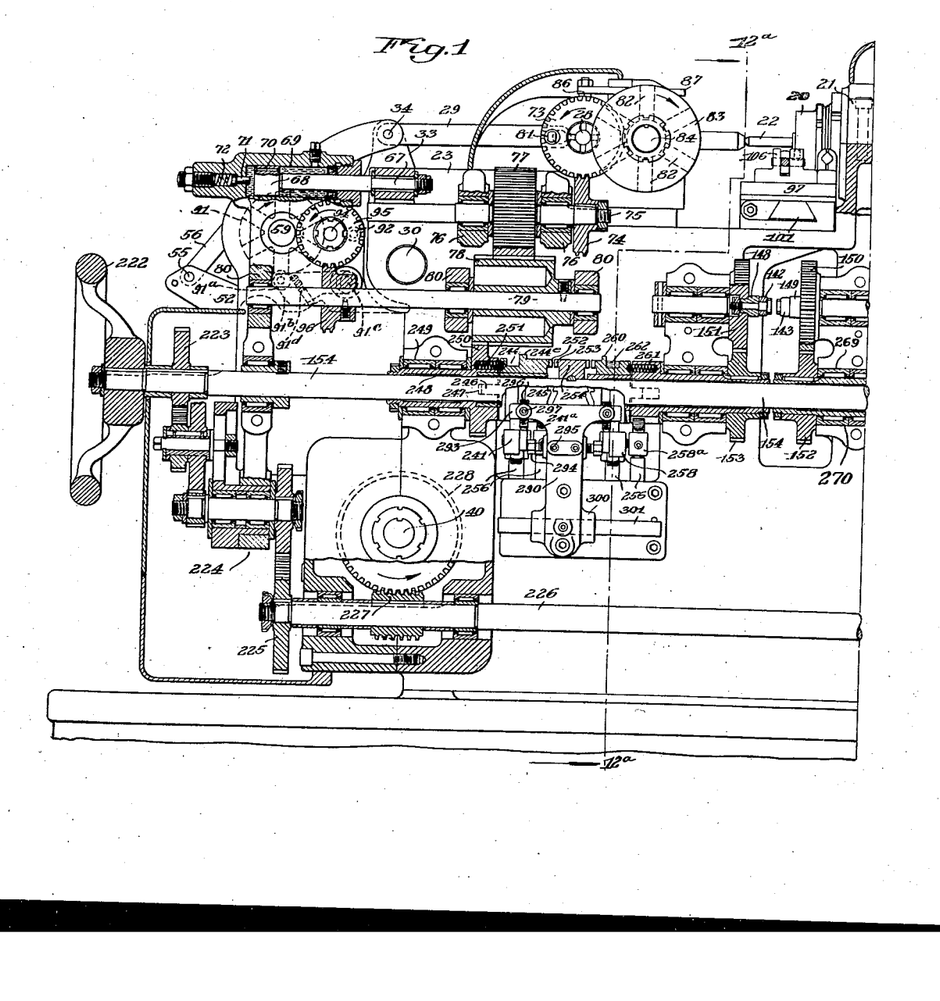
Fig. 1 is an elevation, partly in section through the main or hand wheel shaft, from the rear side of the horizontal turret end of the machine.
Figure 2:
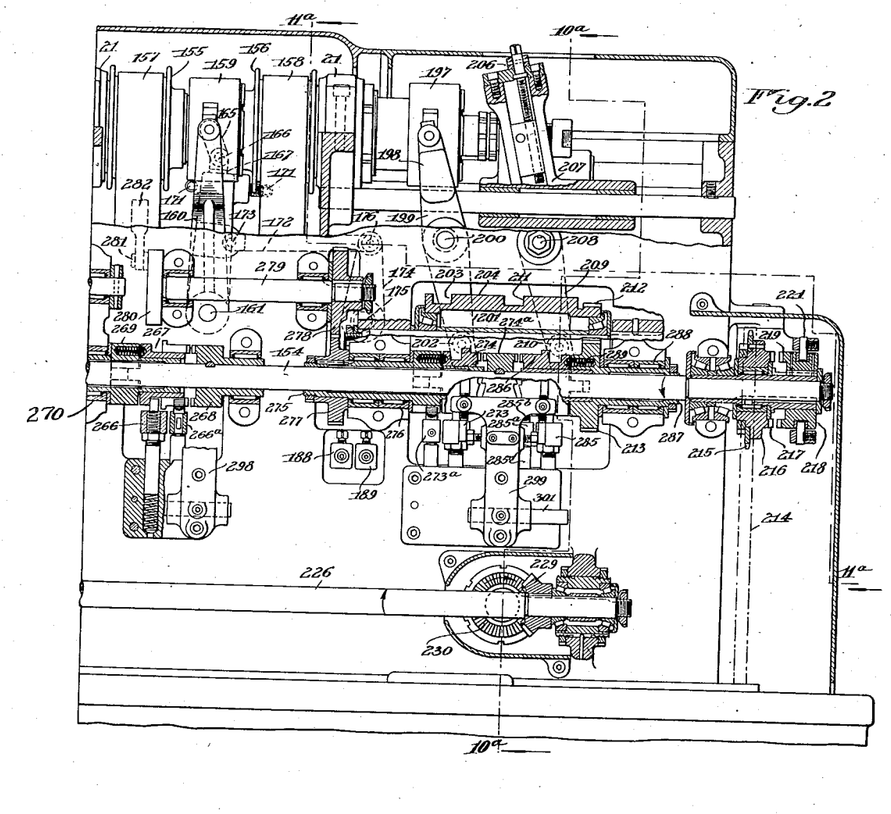
Fig. 2 is a similar view from the rear side of the other or work spindle end of the machine, in continuation of Fig. 1.

The work spindle is likewise provided with the usual, or any suitable means, for controlling the opening and closing of the chuck, or collet, for gripping and holding the work and also with feed finger means for feeding the work piece, while the collet is open, against the stop carried to position by the turret at the proper time, as shown in Figs. 1 and 2. Such means for controlling the collet is indicated generally at 197 (Fig. 2), under control of the forked upper end 198 of a shipper lever 199 pivoted at 200 on the frame. The opposite end 201 of this lever carries a roller 202 cooperating with a cam slot 203 in a drum 204 rotatably mounted on a shaft 205 and intermittently clutched into connection with the main shaft by means hereafter described.

Drum 204 likewise actuates the means for controlling the work feed finger. This means may be of the usual or any suitable variety, comprising in this embodiment, an adjustable block and guide device indicated generally at 206 (Figs. 2 and 10) for actuating the feed finger means on the work spindle, as well understood in the art and forming no part of this invention. The actuating guide is formed on a lever 207 pivotally mounted on a spindle 208 carried by the frame. Lever 207 is extended beyond the pivot to provide an arm 209 carrying a roller 210 engaged in a cam slot 211 on drum 204 which is intermittently rotated in timed relation with the tool slides by means comprising a gear 212 fixed on the drum and meshing with a gear 213 intermittently clutched to the main shaft 154 by means hereafter described.

The mechanism for driving the several parts of the machine in timed coordination with one another comprises preferably the said main, or "hand wheel" shaft 154 (Fig. 2), preferably driven by an electric motor (not shown) within the main frame. A sprocket chain 214 leads from a sprocket wheel rotated by said motor to a sprocket 215 fixed on a hub 216 rotating idly on the shaft and having a lateral clutch face 217. Splined on the shaft is a hub 218 having a cooperating clutch face 219 for clutching the sprocket to the shaft to drive the shaft.

A handle 220 (Fig. 4), conveniently accessible at the left hand end of the machine, has a forked end 221 (Fig. 2) for shifting the clutch part 218 to control the rotation of the drive shaft. This shaft, at the opposite end of the machine, is equipped with a hand wheel 222 by means of which it may be rotated in setting up and adjusting the machine. This main shaft 154 contains the several clutch units for controlling the successive movements of the horizontal turret, turret and cross slides, and the work spindle devices, such clutch units being operated by trip levers actuated by dogs mounted on carriers fixed on the cross slide cam shaft extending along the front side of the machine, which will now be described.

Figures 10, 18, 19:
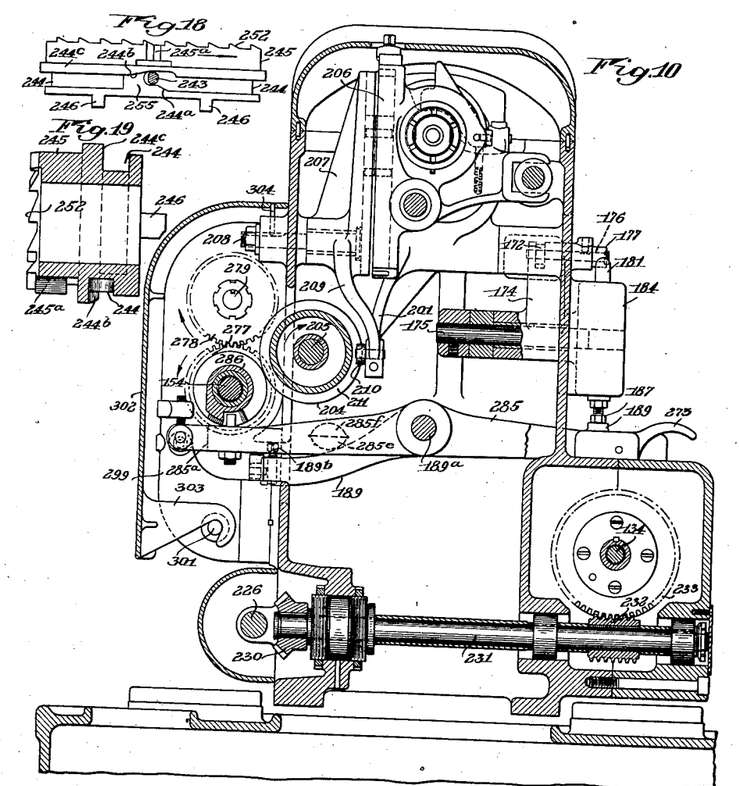
Fig. 10 is a sectional elevation substantially on the line 10a—10a in Fig. 2.
Fig. 18 is a development of the cam slot in one of the clutch parts.
Fig. 19 is a vertical central section of one of the clutch parts, showing the cam slot therein.

Fixed on the main shaft adjacent the hand wheel is a gear 223 (Fig. 1) which drives a train of change speed gears, indicated generally at 224, of the usual or any suitable variety, as well understood in the art, and forming no part of the present invention. This chain of gears drives a gear 225 fixed on a transmission shaft 226 extending along the rear side of the machine (Figs. 1 and 10). Fixed on this shaft is a worm 227 which drives a worm wheel 228 fixed on the shaft 40 which carries and drives the cams 39 described above for imparting the feeding motions to the horizontal turret slide. The opposite end of shaft 226, adjacent the left hand end of the machine (Fig. 2), has fixed thereon a bevel gear 229 meshing with a bevel gear 230 fixed on a shaft 231 which extends across the end of the machine to the front side where it drives a worm gear 232 (Fig. 4) meshing with a worm wheel 233 fixed on the said cross slide cam shaft 134 extending along the front side of the machine.

Figure 4:
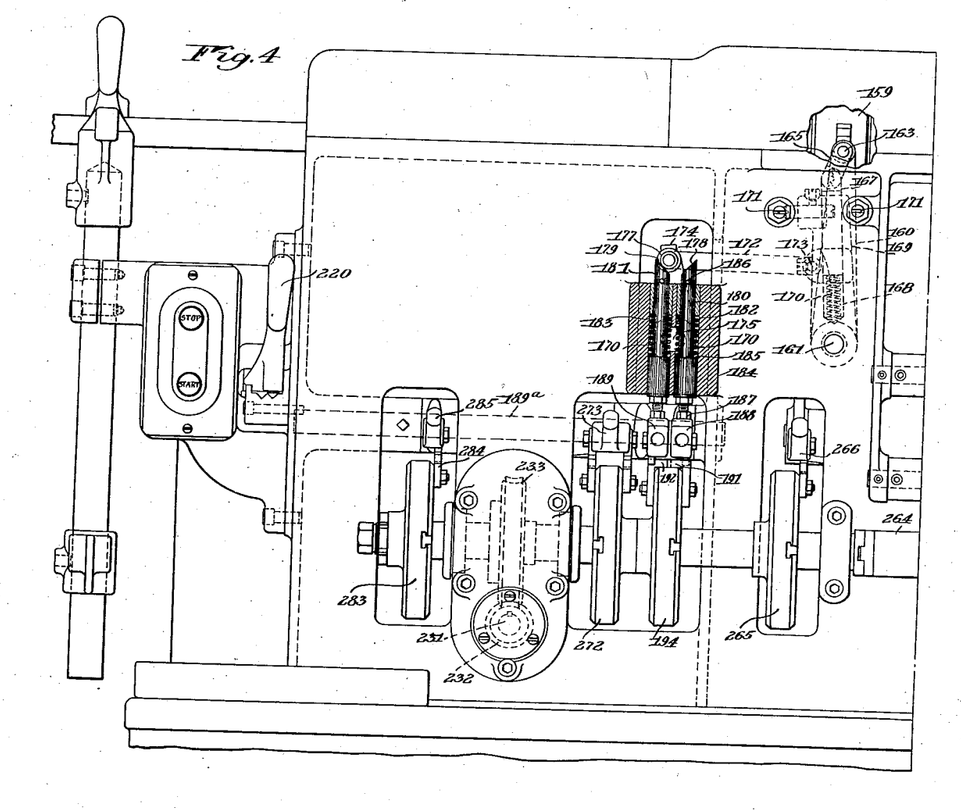
Fig. 4 is an elevation, partly in section, from the front side of the work spindle end, in continuation of Fig. 3.
Figures 12, 16:
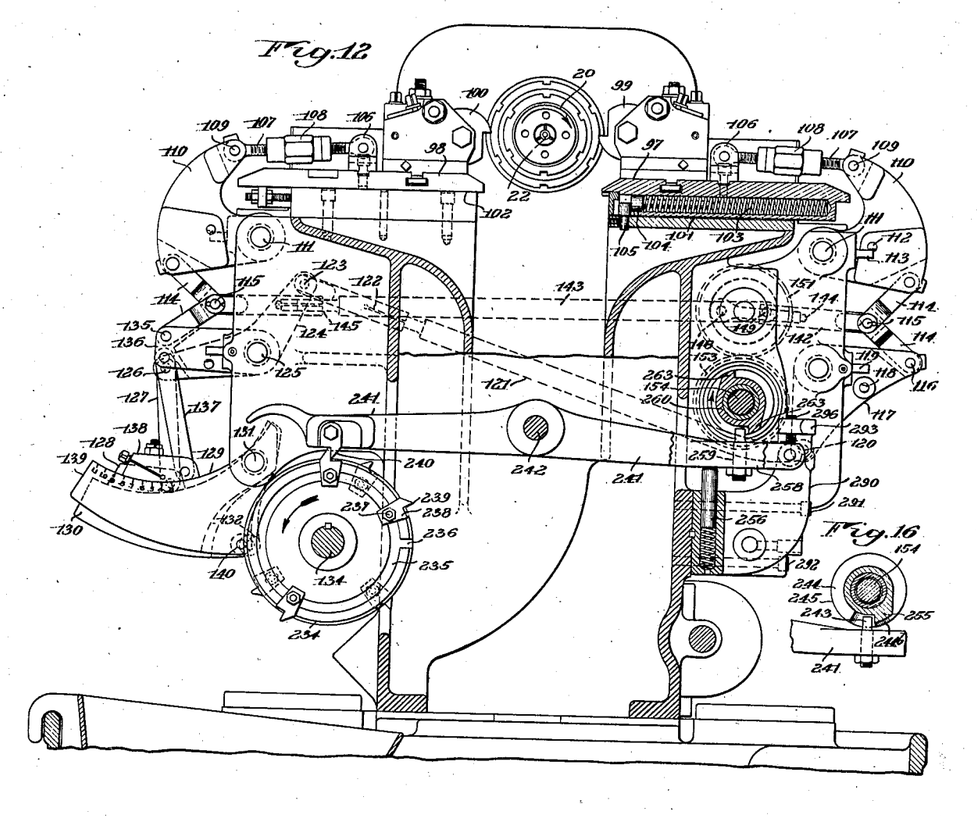
Fig. 12 is a sectional elevation substantially on the line 12a—12a in Fig. 3, showing the cross slides and actuating mechanism.
Fig. 16 is a detailed sectional view of parts for actuating the clutch for controlling the horizontal turret mechanism.

The cross slide cam shaft has fixed thereon a series of carriers on which are mounted the dogs for tripping a series of pivoted levers provided at their opposite ends with means for actuating the several clutches referred to above, as best shown in Figs. 3, 4, and 12. Fixed on the right hand end of the said shaft 134 is a dog carrier 234, the description of which will apply to each of the other carriers of the series on this shaft. Carrier 234 is a wheel formed in one side face with a T-slot 235, having an entrance at 236, and in which are anchored the bolts 237 for clamping on each carrier one or more trip dogs 238. Each dog is thus adjustably bolted at any desired point on the periphery of the circular carrier which may be marked with an appropriate scale (not shown) for so positioning the dog. Each dog has a cam shaped projection 239 for engaging and lifting a cam shaped finger 240 fixed adjacent the end of a trip lever 241. The lever is pivoted on a suitable shaft 242 extending longitudinally of the frame and has an extension on the opposite side of the pivot provided with means for controlling the clutches on the main shaft.

Carrier 234 is that one of the series which controls the several advancing and retracting movements of the horizontal turret slide corresponding to the several tools brought to position by the indexing of the turret and hence is provided with a corresponding number of trip dogs, as indicated in Fig. 12. In view of the number of dogs which may be required for this purpose, this carrier is constructed to receive such dogs on each of its opposite faces, for cooperation with a pair of trip fingers 240, one on each side of the lever, such arrangement serving to facilitate the convenient adjustment of the dogs in any desired arrangement on the carrier. The opposite end of lever 241 is broken away in Fig. 12, but is shown in Fig. 16 as carrying a stud 243 engaging in a slot 244 formed circumferentially in a clutch part 245 mounted to rotate and slide longitudinally on shaft 154 (Figs. 1, 18, and 19). Clutch part 245 has a tongue 246 sliding longitudinally of the shaft in a groove 247 in a sleeve 248 rotating on the shaft and in a bearing 249 on the frame. The sleeve has fixed thereon a gear 250 meshing with the said gear 78 for driving the mechanisms which reciprocate the horizontal turret slide and index the turret and the actuator selecting spindle.

Housed in a recess in gear 250 is a spring 251 pressing against a side face of the clutch part 245 for sliding it longitudinally of the shaft to engage its opposite clutch face 252 with the clutch face 253 on a complementary clutch part 254 which is keyed to the main shaft. The said slot 244 in the clutch part 245 has a portion 244a inclined longitudinally of the main shaft (Fig. 18) which, in one position, strikes stud 243 of lever 241 (Fig. 16), thus shifting the clutch part toward the left in Fig. 1, against spring 251, thus disengaging the clutch face, the parts then being in the position shown in Figs. 16 and 18. Slot 244 contains an abutment 255 (Fig. 16) positioned to engage stud 243, in the disengaged position of the clutch, and stop the rotation of this clutch part except as the rotation is normally stopped by a detent hereafter described. When one of the dogs 238 raises the forward end of lever 241 and lowers its rear end, stud 243 is withdrawn from slot 244 and spring 251 slides the clutch part longitudinally into engagement with the clutch part on the shaft, thus starting the gear 250 and the mechanisms driven thereby. To prevent any clashing of the clutch teeth, cam slot 244 is provided also with an inclined portion 244b formed on the side face of a rib portion 244c of greater radius than the part 255, so as to strike stud 243 while the stud is withdrawn from slot 244, and assist spring 251 in shifting clutch part 245 into engagement with the driving clutch part 254. The trip lever is quickly released by its dog, however, and thereafter returned by a spring plunger 256, mounted in the frame, so that stud 243 reenters slot 244 for repetition of the cycle. This particular clutch part rotates through one revolution with the main shaft before being disengaged, such motion being sufficient for an operation of the mechanisms controlling the movements of the horizontal turret. Clutch part 245 is provided also with a V-shaped notch 245a (Figs. 18 and 19) for cooperation with a detent finger 241a (Fig. 1) as hereafter described to arrest and position the clutch and associated parts between actuations thereof.

The next adjacent carrier 257 on shaft 134 (Fig. 3) is provided with one or more similar dogs for tripping a similar lever 258 pivotally mounted on shaft 242 and carrying at its rear end a similar stud 259 (Fig. 12) for similar coaction with a similar clutch part 260 rotatably and slidably mounted on shaft 154 (Fig. 1). This clutch part is arranged for driving engagement with the said clutch part 254 fixed on the shaft and has a splined driving connection with a sleeve 261 rotating on the shaft and having fixed thereon the said gear 153 for actuating one of the cross slide toggle cranks described above. In this instance the clutch part 260 is engaged twice during each revolution of the main shaft, for one-half of a revolution at each engagement, to advance and retract the cross slide during each operating cycle. This is indicated by the construction of the clutch part 260 in Fig. 12 where its cam slot 262 for the trip lever stud is formed with two diametrically opposite abutments 263, one adjacent each of the inclined portions of the slot which coact with the trip lever stud to engage and disengage the clutch part.

The cross slide cam shaft 134 carries the cross slide cams 133 and 141 (Fig. 3), as described, and is formed adjacent thereto with a mounting surface 264 (Figs. 3 and 4) for a series of cams (not shown) for actuating a vertical turret generally similar to that described in said copending application but not here shown because forming no part of the present invention.

Shaft 134 has fixed thereon, at a point still farther toward the left as seen in Fig. 4, a trip dog carrier 265, for actuating a trip lever 266. This carrier and lever both have substantially the same construction as those described above for the turret and cross slide, and the trip lever controls, in the same way, a similar clutch part 267 cooperating with a clutch part 268 fixed on the main shaft 154. This shiftable clutch part 267 is keyed or splined to a sleeve 269 rotating on shaft 154, and in a bearing 270 on the frame. Keyed on the other end of the sleeve is the gear 152 for actuating the gear train leading to the toggle linkage crank 148 of the other cross slide. As this trip and actuating mechanism are constructed and operate in substantially the same way as those previously described, a more detailed reference thereto is unnecessary.

The next adjacent trip dog carrier on shaft 134 (Fig. 4) is the carrier 194 previously described as operating the pivoted trip levers 188 and 189 which actuate the vertical plungers 180 and 181 controlling the mechanism for the rapid shifting of the clutch for reversing and changing the speed of the work spindle. These trip levers operate the plungers by engaging them directly just above the carrier and so require no associated clutch mechanism as in the case of the other trip levers.

The next adjacent trip dog carrier 272 on shaft 134 (Fig. 4) is provided with dogs on both side faces thereof (not shown) for actuating a trip lever 273 pivotally mounted on shaft 189a, for operating the clutch controlling the actuation of the vertical turret (not shown), when the latter is employed on the machine. Lever 273 (Fig. 2) is substantially the same in construction as levers 241, 258, and 266 described above and controls the engagement of a similar spring actuated clutch part 274 keyed to a sleeve 275 rotatably mounted on the main shaft and in a bearing 276 on the main frame. Clutch part 274 is arranged for engagement with a driving clutch part 274a fixed on the main shaft, as shown. Keyed on sleeve 275 is a gear 277 meshing with a gear 278 fixed on a shaft 279 rotating in bearings on the main frame. Shaft 279 has fixed on the other end thereof a disk 280 carrying a crank 281 with which is connected a rod 282 leading upwardly for connection at its other end (not shown) with the advancing and indexing mechanism of the vertical turret, when employed. As the construction and operation of the carrier 272 and its trip lever and clutch are substantially the same as the corresponding parts for the horizontal turret and cross slides, they will be clearly understood by those skilled in the art and a more detailed reference thereto appears unnecessary.

The last trip carrier 283 adjacent the left hand end of shaft 134 (Fig. 4) is the one which actuates the work piece collet and feed finger of the work spindle referred to above. This carrier has one or more dogs 284 for operating a trip lever 285 pivoted on shaft 189a and having at its other end a stud for controlling a shiftable clutch part 286 into and out of engagement with said clutch part 274a fixed on the main shaft. Clutch part 286 is keyed or splined to a sleeve 287 rotating on the main shaft and in a bearing 288 on the main frame. The sleeve houses a spring 289 for actuating the clutch part toward driving engagement, as described in connection with the horizontal turret. Sleeve 287 has fixed thereon the gear 213 described above as driving the cam drum 204 controlling the actuating mechanisms for the work piece collet and feed finger. The construction, arrangement and operation of carrier 283, trip lever 285, and clutch part 286 are substantially the same as those previously described for controlling the horizontal turret and cross slides, so that a more detailed description thereof would be mere repetition.

The invention further comprises improved means for supporting those ends of the several trip dog levers which operate the spring actuated clutch parts on the main shaft. As will be seen, for example, in Figs. 10 and 12, these levers extend for a substantial distance on opposite sides of the shafts on which they are mounted. The forward ends of these levers are subjected to pivotal actuation only by the trip dogs, but the rear ends are subjected to the lateral and other stresses imposed by operating engagement with the spring actuated, rotating clutch parts and the spring plunger means 256 for urging the lever ends into such engagement with the clutch parts. We have devised a simple, accessible and effective means for supporting the rear ends of the levers against such operating stresses, comprising preferably a bracket means detachably mounted on the main frame and carrying adjustable abutments for supporting the lever ends in proper position against such stresses.

This trip lever supporting means comprises, preferably, a series of brackets detachably mounted on the main frame, one opposite the rear end of each trip lever. As these brackets are substantially alike a description of one will suffice for all. One such bracket 290 (Figs. 1 and 12), for example, is of generally T-shape, the main stem of which is detachably secured by bolts 291 and 292 (Fig. 12) to the main frame. The bracket has a rearwardly and upwardly projecting free end terminating in a laterally extending arm 293 on one or both sides thereof, each extending over the rear end of one of the trip levers, as lever 241. The main body or stem of the bracket is tapped to receive a threaded stud 294 projecting laterally therefrom with its head in abutting contact with the side face of trip lever 241 opposite the side thereof on which the thrusting force of the spring actuated clutch part 245 is imposed. Stud 294 may be threaded into and out of its socket in the side face of the bracket to adjust it for precise supporting engagement with the lever and the stud is preferably locked in adjusted position by means of a set-screw 295. Such means provides a continuous rigid support for the lever at that portion of it which actuates the clutch part against the action of its spring so as to obviate any tendency to cock or deform the lever.

Bracket 290 is provided also with means for adjustably supporting the end of the trip lever against the upward thrusting action of the spring plunger 256 and with its stud properly positioned for coaction with the cam slot 244 of the corresponding clutch part. To this end the laterally projecting cross arm 293 of the bracket is formed with a vertical, threaded opening adjustably receiving a set-screw 296, the lower end of which below the arm is adjustably positioned to form a stop for the upward movement of the lever end. Set-screw 296 is preferably locked, after adjustment, by a lateral set-screw 297, as shown. It will thus be seen that set-screw 296 affords an adjustable but rigid abutment for supporting the lever end against the thrust of its spring actuated plunger and preventing the transmission of such thrust to the rotatable clutch part. The lever end is thus fully and precisely supported against the forces imposed thereon and substantially at the point of application of such forces, thus effectively obviating any cocking or deformation of the lever.

Bracket 290 is provided on its opposite side with similar devices for supporting cross slide trip lever 258. A single bracket 298 of the same construction (Fig. 2) is provided for the other cross slide trip lever 266 and a double bracket 299 is supplied for supporting the trip lever 273 for the vertical turret and trip lever 285 for the devices controlling the work piece collet and feed. It will be apparent that in the setting up of the machine, as well as in any repairs or replacements, these several supporting brackets may be readily removed to afford convenient access to the trip lever rear ends and cooperating and adjacent parts. When the brackets are remounted on the frame, the adjustably threaded stop parts 294 and 296 may be accurately positioned to closely back up and support the lever end.

Figure 17:
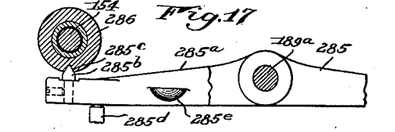
Fig. 17 is a detailed view, partly in section and broken away, showing a stop mechanism for the clutch parts operated by the trip levers employed in the machine.

Means are also provided, as disclosed in said copending application, for arresting the rotation of the clutch parts on the main shaft after they have been released by the trip levers from driving engagement with the shaft and have completed their respective operations. Such means, herein disclosed in improved form, preferably comprise, for each trip lever, as 285, a companion lever as 285a (Fig. 17) pivotally mounted on shaft 189a on the main frame. Lever 285a (Fig. 10) extends rearwardly from this shaft and terminates short of its companion lever 285, but with its end lying below the clutch part 286 on main shaft 154. This end of the lever carries an upwardly projecting, beveled detent stud 285b, cooperating with a notch 285c formed in clutch part 286 at one side of the cam groove which receives the trip lever stud. Stop lever 285a is urged toward the clutch part by a spring actuated plunger 285d on the main frame. The lever is provided, however, with a lug 285e located below a cooperating lug 285f on companion lever 285, so that, when the latter is tripped by its dog, it depresses lever 285a so as to withdraw the detent 285b from the notch in the clutch part, at the same time that the clutch part is released by the trip lever for engagement with the drive shaft. The detent then rides on the full surface of the clutch part until the latter completes a revolution when the detent, under actuation by the spring plunger 285d, snaps again into the clutch 285c and arrests the rotation of the clutch part and its associated members. This mechanism operates rapidly but without undue shock to the parts and retains the clutch part precisely in its disengaged position and in proper relation with the stud of the trip lever until the latter is again tripped.

Detent or stop mechanisms are employed also in conjunction with the several other trip levers and associated clutch parts, but as all of these have substantially the same construction and operation as described above, detailed reference thereto will not be necessary. Such a detent for the horizontal turret clutch is shown at 241a (Fig. 1). A similar detent lever for one of the cross slide operating clutches is indicated at 258a, cooperating in this case with a detent notch in the sleeve 261 to which the clutch part 262 is splined. A similar detent lever for the other cross slide actuating clutch is indicated at 266a (Fig. 2). In the case of the cross slide clutches which make one-half revolution at a time, the clutch part has two detent notches, such as 285c. A similar detent is shown at 273a for the vertical turret actuating clutch, cooperating in this case with a notch in the sleeve 275 to which the clutch part is splined.

The brackets 298 and 299 for supporting the rear ends of the trip levers are utilized for the further purpose of supporting casing parts for housing portions of the machine. To this end, the lower portion of bracket 290 (Fig. 1), for example, is formed with thickening bosses 300 having an opening therethrough in which is received and supported a bar 301 projecting at one or both ends beyond the bracket. The other brackets are similarly equipped. Parts of the casing or housing of the machine, as 302 (Fig. 10), carry hooked arms, as 303, arranged to be detachably engaged over the bar 301 of each bracket, as a convenient means for supporting the lower ends of such casing portions, which are provided with additional means for supporting the same on the frame adjacent their tops, as by means of a projecting lug as shown at 304.

The operation of the various portions of the machine have been explained above in connection with the description of their construction.

As the main shaft is rotated by the chain connection 214 with its motor, it drives, through its gear and shaft connections, the cross slide cam shaft 134 which mounts also the various trip dog carriers. The horizontal turret is indexed and advanced to present the work positioning stop as shown in Fig. 1. This advance of the turret and stop is accomplished first through the crank on the slide and the rugged rocker hub 32 and its arms, the precise positioning of the work stop being subsequently brought about by the thrust of the appropriate actuator arm 56 as controlled by a corresponding cam on the horizontal turret cam shaft. The work piece is then released, advanced against the stop by its feed finger and again clamped in the rotating collet of the work spindle. The horizontal turret is withdrawn, indexed to present the next tool and similarly advanced and fed in its cutting action on the work. Where needed in connection with threaded parts, the work spindle is reversed with any desired change in speed, as the tool is withdrawn and the spindle is then again returned to its normal cutting rotation, this operation of the work spindle being accomplished by the rapid "load and fire" mechanism described. The successive operations of the horizontal turret are accomplished by appropriate trip dog and lever operation of the controlling clutch part 245, including the coordinated indexing of the turret and the actuator arms, and the movement of the slide. At the desired points in the forming of the work piece, the cross slides are advanced and retracted by their trip mechanisms and cams and the simple, rigid, and accessible mechanisms associated with them. The parts of the machine are compactly arranged, but in such a way as to be readily accessible for setting up the machine for each job, as described in said copending application.

The invention thus accomplishes its objects and while its principles of construction and operation have been specifically described in connection with the preferred embodiment, it will be understood that such description is intended by way of illustration rather than by way of limitation and that various alterations and modified embodiments will readily occur to those skilled in the art within the scope of the appended claims.

We claim:

1. In an automatic screw machine having a work spindle and a tool turret and slide movable toward and from said spindle, the combination with said slide of means for moving the same comprising a plurality of cams, a plurality of separate actuators operated by said cams, respectively, lever means mounted for pivotal movement about an axis, means for effecting pivotal movement of said lever by each of said actuators in succession, and a connection between said lever means and said slide for moving said slide.

2. In an automatic screw machine having a frame, a work spindle and a tool turret and slide movable toward and from said spindle on said frame, the combination with said slide of means for moving the same comprising cam means, a plurality of actuators operated one after another by said cam means, lever means mounted for pivotal movement in fixed bearings in said frame, means for effecting pivotal movement of said lever by each of said actuators in succession, and link means connecting said lever means and said slide for moving said slide.

3. In an automatic screw machine having a frame, a work spindle and a tool turret and slide movable toward and from said spindle on said frame, the combination with said slide of means for moving the same comprising cam means, a plurality of actuators operated one after another by said cam means, an elongated hub having a pivotal movement about spaced bearings at its ends, respectively, fixed in said frame, an arm on said hub, means for connecting each of said actuators, individually and successively, with said arm to effect pivotal movement of said hub, a second arm on said hub, and link means connecting said second arm and slide for moving said slide.

4. In an automatic screw machine having a work spindle and a tool turret and slide movable toward and from said spindle, the combination with said slide of means for moving the same comprising a rotatable crank on said slide, a plurality of cams, a plurality of levers each operated by one of said cams, a plurality of actuators each operated by one of said levers, lever means mounted for pivotal movement about an axis, means for effecting pivotal movement of said lever means by each of said actuators in succession, link means connecting said lever means and crank, and driving means for said crank and cams.

5. In an automatic screw machine having a work spindle and a tool turret and slide movable toward and from said spindle, the combination with said turret and slide of means for moving the same comprising a lever mounted for pivotal movement about a fixed axis and having an operating connection with said slide, a plurality of actuating arms having a selecting movement to position the same for coaction with said lever and also an actuating movement for moving said lever, a rotary spindle provided with means for moving said arms selectively and individually to a position for coaction with said lever, a shaft, a plurality of cams on said shaft for moving said arms to actuate said lever, means for indexing said turret and spindle in predetermined sequence and means for actuating said index means and said cam shaft.

6. In an automatic screw machine having a work spindle and a tool turret and slide movable toward and from said spindle, the combination with said turret and slide of means for moving the same comprising a lever mounted for pivotal movement about a fixed axis and having an operating connection with said slide, a plurality of actuating arms having a movement to position the same for coaction with said lever and also a movement for actuating the same, a rotary spindle located below said arms and provided with means for moving the same selectively and individually into position for coaction with said lever, a plurality of cams for moving said arms, respectively, for actuating said lever, means for indexing said turret and said spindle in predetermined sequence and means for actuating said index means and said cams.

7. In an automatic screw machine having a work spindle and a tool turret and slide movable toward and from said spindle, the combination with said turret and slide of means for actuating the same comprising a rotatable crank on said slide, a lever mounted for pivotal movement about a fixed axis and connected with said crank, a plurality of actuating arms having a selecting movement to position the same for coaction with said lever and also a movement for actuating the same, a rotary spindle located below said arms and provided with means for raising the same selectively and individually for coaction with said lever, a plurality of cams connected with said actuating arms for moving the same to actuate said lever, means for indexing said turret and said spindle and means for driving said crank, index means and cams in predetermined sequence.

8. In an automatic screw machine having a work spindle and a tool turret and slide movable toward and from said spindle, the combination with said slide of means for moving the same comprising a plurality of cams, a plurality of separately movable actuators operated by said cams, respectively, lever means mounted for pivotal movement about a fixed axis, means for moving said actuators, individually and successively, to position for actuating said lever means, and a connection between said lever means and said slide for moving said slide.

9. An automatic screw machine having a frame, a tool turret and slide movable on said frame, means for moving the same comprising a plurality of cams, a plurality of actuators operated by said cams, respectively, means for connecting said actuators, individually and successively, with said slide for advancing the same, adjustable stop means for limiting the advance of said slide, spring means for retracting said slide, cushioning means connecting said frame with said slide for cushioning the retraction thereof, and means for actuating said cams and connecting means.

10. An automatic screw machine having a frame, a tool turret and slide movable on said frame, means for moving said slide comprising a plurality of cams, a plurality of separately movable actuators operated by said cams, respectively, means for moving said actuators, individually and successively, to position for actuating said slide to advance the same, a coiled compression spring arranged between said frame and slide for retracting said slide, a dashpot connecting said frame and slide for cushioning the retraction thereof, and means for actuating said cams and said actuator moving means.

11. An automatic screw machine having a frame, a tool turret and slide movable on said frame, means for reciprocating said slide comprising a crank rotatably mounted on said slide, a plurality of cams on said frame, a plurality of actuators operated by said cams, respectively, means for connecting said actuators, individually and successively, with said crank for advancing said slide, a rotary shaft on said frame, a rotary shaft on said slide, gearing connecting said slide shaft with said crank, a pair of intermeshing gears connecting said shafts, one of said gears being elongated to maintain meshing engagement with the other thereof during movement of said slide, and means for actuating said shaft on said frame and said actuator connecting means and cams.

12. An automatic screw machine having a frame, a tool turret and slide movable on said frame, indexing means for said turret on said slide, a crank rotatably mounted on said slide for reciprocating the same, a plurality of cams on said frame, a plurality of actuators operated by said cams, respectively, means for connecting said actuators, individually and successively, with said crank for advancing said slide, a rotary shaft on said frame, a rotary shaft on said slide, gearing connecting said slide shaft with said indexing means and crank, a pair of intermeshing gears connecting said shafts, one of said gears being elongated to maintain meshing engagement with the other thereof during movement of said slide, gearing connecting said frame shaft with said actuator connecting means, and means for actuating said frame shaft and said cams.

13. An automatic screw machine having a frame, a tool turret and slide movable on said frame, means for reciprocating said slide comprising a crank rotatably mounted on said slide, a plurality of cams on said frame, a plurality of separately movable actuators on said frame operated by said cams, respectively, lever means mounted for pivotal movement about a fixed axis on said frame, means for moving said actuators, individually and successively, to position for engaging and actuating said lever means, a connection between said lever means and said crank for moving said slide, and means for actuating said cams and said crank and said actuator moving means.

14. An automatic screw machine having a frame, a slide, a turret shaft extending transversely of the direction of movement of said slide, a shaft on said slide parallel with said turret shaft and provided with a crank for reciprocating said slide, indexing means connecting said crank and turret shafts, a plurality of cams on said frame, a plurality of separately movable actuators on said frame operated by said cams, respectively, lever means rocking about a fixed axis on said frame, means for moving said actuators, individually and successively, to position for engaging and actuating said lever means, a connection between said lever and said crank for advancing said slide, and means for actuating said cams and said crank shaft and said actuator moving means in timed coordination with one another.

FREDERICK G. SILVA.
WRAY S. SEYMOUR.